INVENTOR.
VAN L. FRAZIER
BY
ATTORNEYS

Jan. 19, 1965 V. L. FRAZIER 3,166,142
SUSPENSION SYSTEM FOR TANDEM AXLES INTERCONNECTED
BY POWER TRANSMISSION MEANS
Filed Aug. 22, 1961 3 Sheets-Sheet 2

INVENTOR.
VAN L. FRAZIER

BY

ATTORNEYS

INVENTOR.
VAN L. FRAZIER
BY Ely, Frye & Hamilton

ATTORNEYS

3,166,142
SUSPENSION SYSTEM FOR TANDEM AXLES INTERCONNECTED BY POWER TRANSMISSION MEANS
Van L. Frazier, Dayton, Ohio, assignor to The Dayton Steel Foundry Company, Dayton, Ohio, a corporation of Ohio
Filed Aug. 22, 1961, Ser. No. 133,191
4 Claims. (Cl. 180—22)

The present invention relates to a suspension system for tandem axles interconnected by a power transmission means. More particularly, the present invention relates to an equalized tandem spring arrangement and torque rod assembly for tandem axles interconnected by a belt or chain drive. Specifically, the invention relates to an improved equalizing means for tandem elongated springs mounting dual axles interconnected by a V-belt or chain drive.

Most prior art constructions for tandem axles interconnected by a power transmission means suspend the two axles from two springs, one on each side of the vehicle. This arrangement has always been considered necessary in order to maintain a relatively uniform distance between axles and thereby maintain sufficient tension on the driving connection for transmission of driving power.

Dual dead (or non-driven) axle suspensions are significantly improved by the concept of utilizing tandem springs, one pair on each side of the vehicle, and interconnecting their adjacent ends by an equalizing means. According to this prior art construction each axle has its own pair of suspension springs to provide a smooth ride and the equalization provides a desired proportioning of the load between the axles irrespective of any uneven contour of the road surface over which the vehicle is traveling. Such equalized spring constructions, however, have always been thought to be inoperable for tandem axles interconnected by a power transmission means because of the wide fluctuation of the distance between the axles normally incident to such a construction.

It is therefore an object of the present invention to provide an equalized tandem spring suspension which maintains a substantially constant dimension between tandem axles in normal operation.

It is a further object of the present invention to provide an equalized tandem spring suspension for tandem axles interconnected by a power transmission means, such as a belt or chain, in which an increase in the vehicle load tightens the power transmission means in proportion to the load carried.

It is a still further object of the present invention to provide an equalized tandem spring suspension having torque rods oriented above and below the axles to divide the brake torque between the axles and adjustable to provide and maintain the desired angle between the drive shaft and universal joint bearings.

It is a still further object of the present invention to provide a rubber-backed spring seat which affords additional vertical deflection of the axle without additional rotational deflection of the equalizer and without imparting a reverse deflection to the spring itself.

It is a still further object of the present invention to provide an equalized tandem spring suspension for tandem axles interconnected by a drive belt which reduces road shock and eliminates friction wear in the metal-to-metal contact between the spring and its seat by utilizing a removable rubber-backed spring seat.

These and other objects of the invention, and further advantages thereof, will become apparent in the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In general, a suspension system according to the present invention mounts each tandem axle to the medial portion of a straight or semielliptical leaf spring. If the semielliptical spring is utilized the ends of the spring are upwardly disposed away from the axles. The adjacent ends of the tandem springs, whether straight or semi-elliptic, are interconnected through a rockable equalizer mounted on the frame of the vehicle. The opposite ends of the springs rest in rubber seated spring chairs also attached to the frame. A rigid arm extends downwardly from the equalizer mounting bracket to pivotally receive the ends of the lower torque rods which extend toward each other and slightly upwardly from their attachment beneath each axle.

An upper torque rod is secured to each axle above the axis thereof. These upper torque rods also extend toward each other on a slight upward inclination and are pivotally secured to a lateral cross member of the frame of the vehicle.

By this construction, as is more fully set forth hereinafter with reference to the drawings, a spring suspension is provided which permits and facilitates the interconnection of the axles by a power transmission means.

Referring to the drawings.

Figure 1:
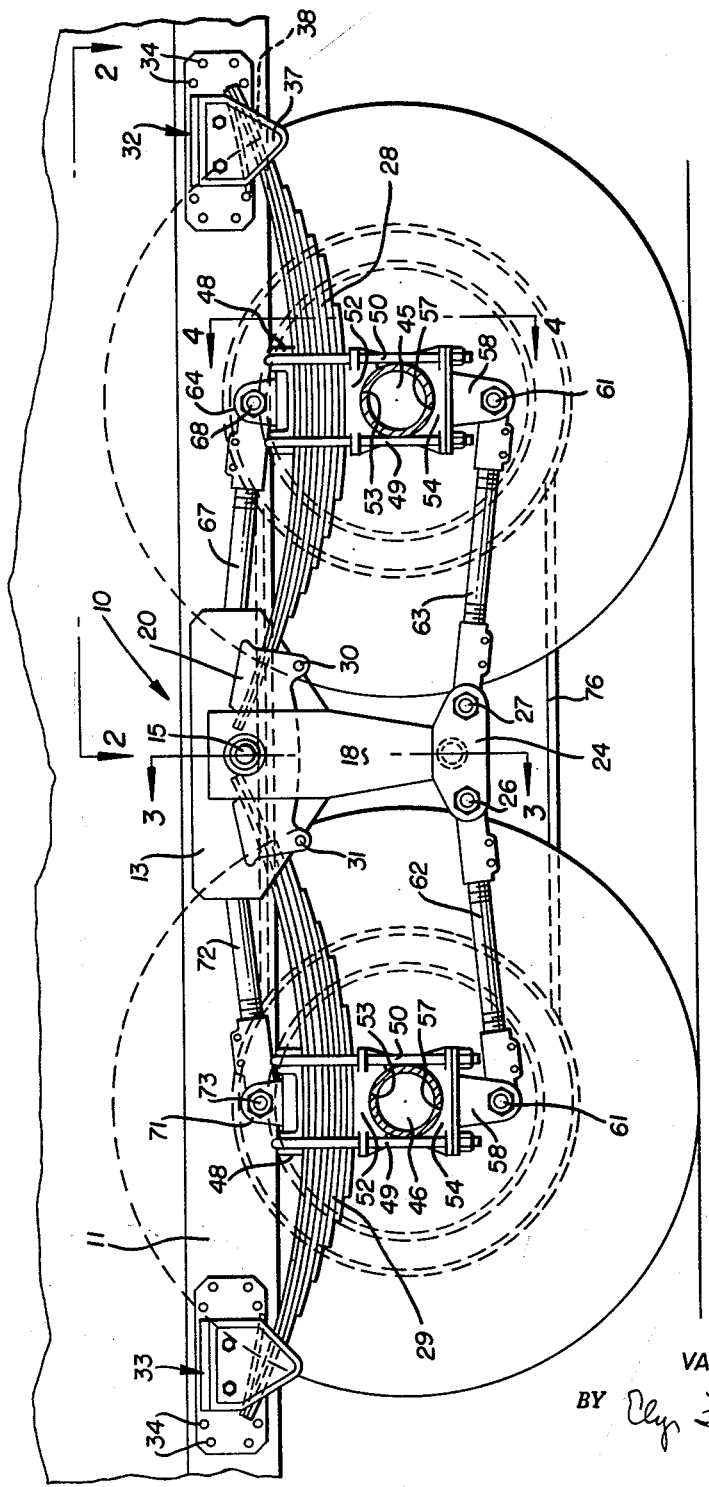
FIG. 1 is a side elevation of a spring suspension according to the present invention with the inner of the dual wheels shown in phantom.
Figure 2:
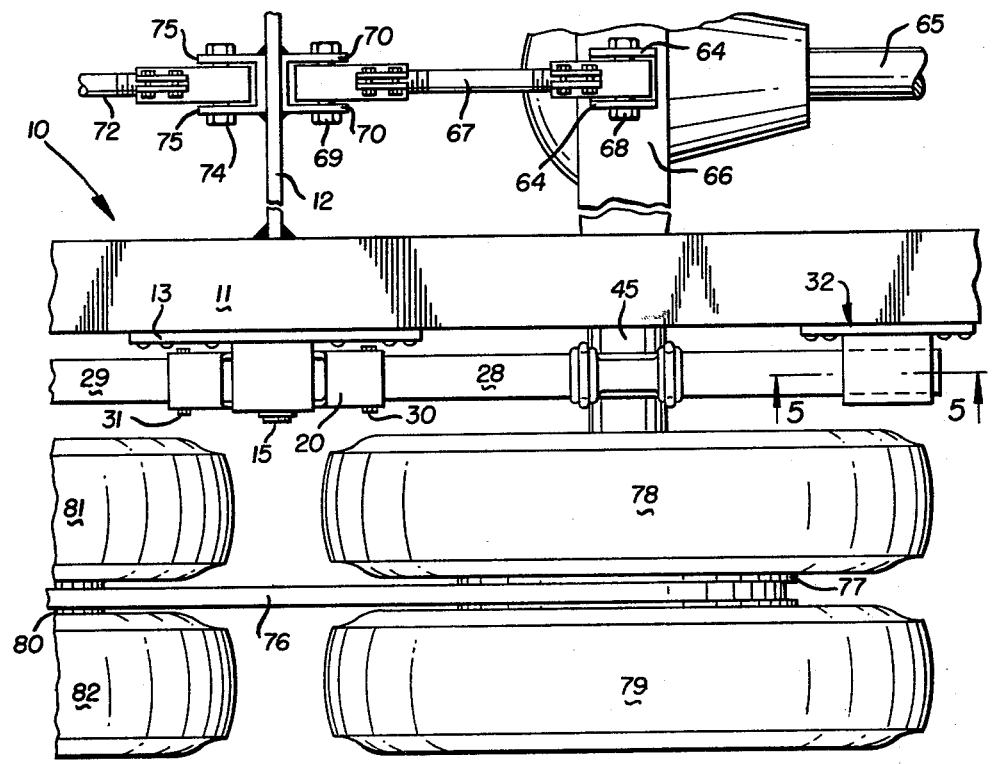
FIG. 2 is a top plan view of the suspension shown in FIG. 1, showing a portion of the vehicle frame on which it is mounted.
Figure 3:
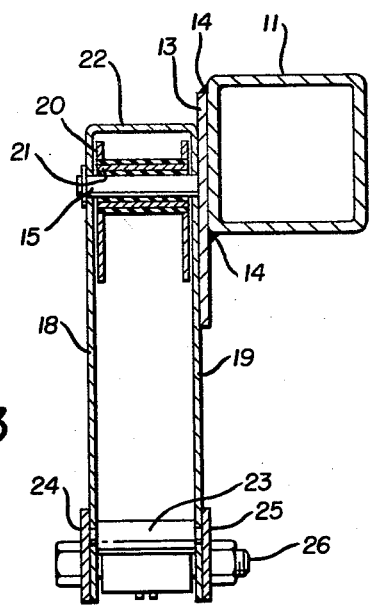
FIG. 3 is an enlarged cross section taken substantially on line 3—3 of FIG. 1.
Figure 4:
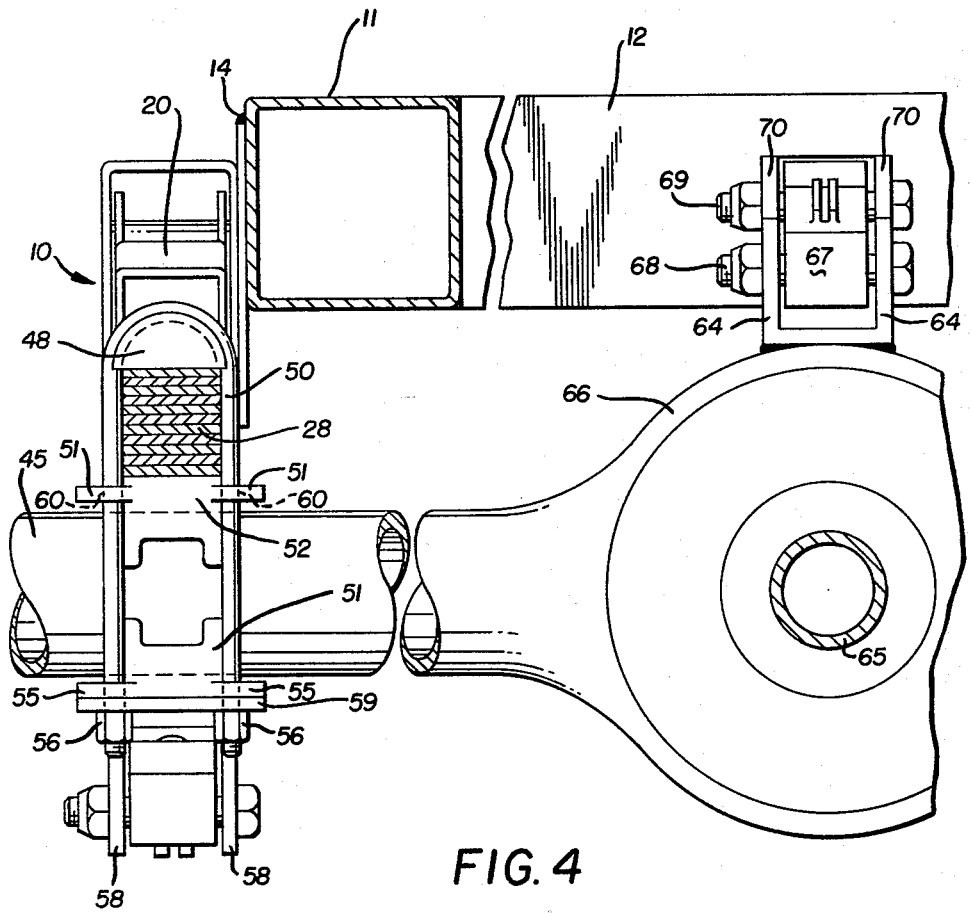
FIG. 4 is an enlarged cross section taken substantially on line 4—4 of FIG. 1; and, FIG. 5 is an enlarged side section of a spring hanger taken substantially on line 5—5 of FIG. 2.

Referring particularly to FIGS. 1 and 2, the improved suspension is indicated generally by the numeral 10. A longitudinal side frame member 11 and a lateral member 12 represent the vehicle on which the suspension 10 is mounted. An equalizer mounting plate 13 is secured to the longitudinal member 11, as by welding 14. As best shown in FIG. 3, a stub-shaft 15 extends perpendicularly outwardly from plate 13, extending through the spaced apart, depending arms 18 and 19, which are rigidly secured to the frame through plate 13. A walking beam or equalizer 20 is rockably journaled on shaft 15 between arms 18 and 19. A rubber bushing 21 is preferably interposed between shaft 15 and equalizer 20.

Arms 18 and 19 are stabilized by a top plate 22, which as shown is unitary therewith, and a spacer pin 23, extending between their lower extremities. Horizontally disposed wing plates 24 and 25 are secured to the outer face of arms 18 and 19, respectively. Wing plates 24 and 25 are bored to receive torque connecting bolts 26 and 27.

Figure 5:
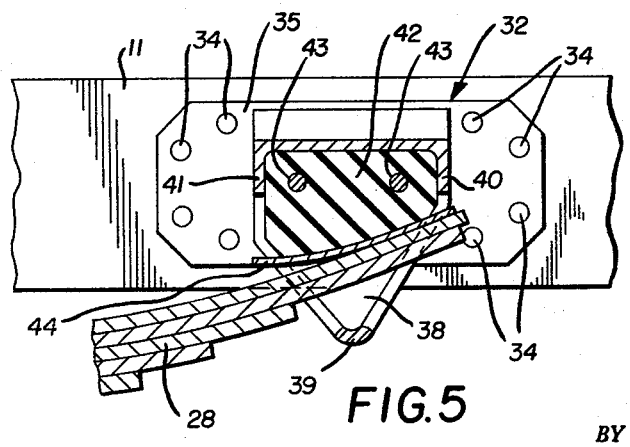

The adjacent ends of two tandem springs 28 and 29, which as shown are semielliptic, are received in the opposite ends of equalizer 20 and prevented from displacement or jumping out by pins 30 and 31 secured to the equalizer transversely beneath the ends of the springs. The opposite ends of each of the tandem springs are received in novel hanger brackets 32 and 33 which are secured to the longitudinal frame member 11, as by a plurality of bolts 34. As best seen in FIG. 5, the hanger bracket bolts 34 preferably pass through an anchor plate 35 to which the main portion of each hanger bracket is in turn secured, for example, as by welding. Because the hanger brackets 32 and 33 are identical, except for being adapted for front and rear tandem installation, only hanger bracket 32 will be described in further detail.

Hanger bracket side plates 37 and 38 straddle the ends of spring 28 and are joined therebeneath by a stop pin 39 which functions to keep ends of the spring received therein from displacement or jumping out of its respective hanger bracket. A cavity is defined above spring 28 between plates 37 and 38 by front and rear transverse walls 40 and 41, respectively. The rear wall 41 terminates on substantially the same horizontal plane as front wall 40. A resilient, preferably rubber, block 42 having a longitudinal cross section of substantially trapezoidal configuration (as shown in FIG. 5) is secured within the cavity by two pins 43 which extend between plates 37 and 38. The two parallel sides of the trapezoid thus defined are generally vertically disposed with the longer of the two sides being closer to the equalizer, i.e., adjacent wall 41. A longitudinally, upwardly curved metallic spring seat 44 is bonded to the under side of block 42 for contact with the end of spring 28. Thus, in the unloaded static condition of the suspension system the distance between the spring seat 44 and wall 40 is always considerably less than the distance between seat 44 and wall 41.

When the vehicle is unloaded, the spring seat 44 does not contact either wall 40 or 41, thus providing a rubber riding suspension for the unburdened vehicle. As the vehicle is loaded, the rubber block 42 is compressed until the seating plate 44 abuts the lower edge of wall 40. In this disposition the spring is supported by the seat 44 near the outer extremity of the spring 28. As the load increases and the spring is further deflected the spring seat 44 supports the spring 28 successively further inwardly of the end of the spring, thus decreasing its effective length. In response to this progressively inward location of the contact between the spring and its seat, the seat 44 will swing arcuately toward wall 41 against the compressive resilience of the rubber block 42, thereby increasing the vertical displacement of the axle for a given degree of rotation of the equalizer as well as preventing the spring from assuming a reverse curve deflection at its outer end.

This particular configuration of rubber-backed spring seat 44 and its cooperative hanger bracket 32 also prevents frictional wear between the spring and its seat by permitting the seat to float longitudinally with the spring as it deflects, thereby compensating for the corresponding change in its longitudinal dimension.

Beneath the medial portion of the springs 28 and 29, are secured the forward and rear tandem axles 45 and 46, respectively. A saddle 48 is positioned on the upper concave surface of each spring 28 and 29 and is grooved at each end to receive the base of U-bolts 49 and 50. The legs of the U-bolts pass through eyes 51 on the individual spring chairs 52 which abut the lower or convex surface of each spring 28 and 29 and provide the arcuate seat 53 to engage the respective axles 45 or 46. A lower chair 54 similar to chair 52 is positioned beneath each axle in opposition to chair 52. Eyes 55 on chair 54 similarly receive the legs of U-bolts 49 and 50. A nut 56 on each of the U-bolt legs tightens the entire assembly engaged by the U-bolts, thereby securing each axle between the arcuate seat 57 of lower chair 54 and the arcuate seat 53 on chair 52.

A pair of parallel connecting ears 58 extend below each lower plate 59, also secured by the U-bolts 49 and 50 through bores 60. Connecting ears 58 are provided with a bore to receive a torque connecting bolt 61.

An adjustable torque rod 62 is pivotally connected from connecting bolt 26 to the connecting bolt 61 below axle 46 and a similar adjustable torque rod 63 is pivotally connected between connecting bolt 27 and connecting bolt 61 below axle 45. It should be noted that the connecting bolts 26 and 27 are disposed somewhat higher than connecting bolts 61 in order to impart a slightly inclined convergence to the torque rods, for a reason to be hereinafter more fully described.

Additional torque rods are required above the axles, but this requirement may be satisfied by a single torque rod tying into the vehicle frame above the axis of each axle. A pair of connecting ears 64 are rigidly secured to and extend upwardly from the forward axle 45. In the configuration shown in the drawings, the forward axle 45 is driven from a power source (not shown) by a drive shaft 65. This is illustrative of use of the suspension 10 on a tractor or drive vehicle. The suspension 10 could be employed with equal facility on a trailer or non driven vehicle in which event neither axle 45 or 46 would be driven. In either construction the ears 64 are secured medially of the lateral dimension of the vehicle on the respective axles, or as shown, with the forward ears 64 on the differential housing 66. One end of an adjustable torque rod 67 is pivotally secured to ear 64 by a nut and bolt 68. The other end of torque rod 67 is pivotally connected to the lateral frame member 12 by a nut and bolt 69 which passes through a similar pair of connecting ears 70 mounted on lateral frame member 12. As best shown in FIG. 1, the upper torque rod 67 is inclined similarly to and is, therefore, substantially parallel to the lower torque rod 63 connected to the forward axle 45.

A pair of connecting ears 71 extend upwardly from the medial portion of rear axle 46 and are pivotally connected to one end of an upper torque rod 72 by a nut and bolt 73. The other end of torque rod 72 is connected to the lateral frame member 12 by a nut and bolt 74 passing through a pair of connecting ears 75 also mounted on lateral frame member 12. Upper torque rod 72 is inclined similarly to and is, therefore, substantially parallel to lower torque rod 62 connected to the rear axle 46.

In the embodiment depicted the drive means comprises a V-belt 76 which provides a power connection between axles 45 and 46. The belt 76 is reaved around a sheave 77 mounted between the dual tires 78 and 79 on forward axle 45 and around a sheave 80 similarly mounted between dual tires 81 and 82 on the rear axle 46. It must be understood that not only could the power transmission drive means comprise a chain connected over suitable sprocket means, but also a multiple drive means could be employed. For example, one or more drive means could also interconnect the axles inwardly of tires 78 and 81, respectively. This disposition of the drive means axially inwardly of the tires is especially suitable if a single wide base tire were substituted for each pair of dual tires.

Because of the slightly inclined convergence of opposed torque rods, as load on the vehicle is increased the upward movement of the axles tends to decrease the inclination of the torque rods. As can be seen particularly with reference to FIG. 1, when the vehicle is loaded the flexing of the springs allows the frame, as represented by longitudinal frame member 11, to move into closer proximity to the axles 45 and 46. Thus the pivotal connections of the torque rods at the axles also move into closer proximity to the frame. The other end of the torque rods, however, being pivotally secured either directly to a frame member, or to a member rigidly attached thereto, maintains a constant dimensional relationship to the frame irrespective of the load being carried by the vehicle.

Because of the convergent inclination of the torque rods in the static unloaded condition of the vehicle, as the load is applied, the axle ends of the torque rods move in a slightly arcuate path about their opposite ends. This movement slightly increases the dimension between the axles. The increased dimension effected is measured in terms of fractions of an inch, but is sufficient to allow an increase in tension on the belt 76. Note that the floating spring seat 44 compensates for this without frictional wear to the spring 38. This increased tension on belt 76 effects an increased frictional contact of the belt with sheaves 77 and 80 and thereby increases the power transmitting ability therebetween.

In the configuration depicted, wherein the power is directly applied to the forward axle, and the rear axle is connected to the fore axle in the manner described, the rear or tag axle acts like a directly powered axle and does not hop or chatter as it does in most prior art constructions.

Furthermore, the adjustability of the torque rods permits the axles to be selectively rotated and thereby permits the adjustment of the angle between the drive shaft and its connection to the powered axle. A universal joint is generally used for this construction and the universal joint manufacturers customarily specify the most suitable angle. A construction according to the present disclosure allows a universality of application.

The unique suspension construction hereinbefore described provides a minimal variation in the dimension between axles; constrains each axle to a vertical disposition in its up and down movement; divides the brake torque between the axles; and, equalizes the load between axles irrespective of an uneven road surface.

What is claimed is:

1. A suspension system for tandem axles, said suspension being adapted for attachment to the frame of a vehicle and having tandem semielliptic, leaf springs mounting said axles, means for equalizing the adjacent ends of said springs, and a torque assembly comprising a rigid torque connecting arm attached to said frame medially of said axles, lower torque rods, one end of a lower torque rod being connected to each axle below the axis thereof, the other end of each said torque rod being connected to said rigid arm, the connection to said rigid arm being higher than the connection to said axle when the vehicle is unloaded and in substantially the same plane when said vehicle is loaded, and upper torque rods, one end of an upper torque rod being connected to each axle above the axis thereof, the other end of each said upper torque rod being connected to said frame medially of said axles, the upper and lower torque rods connected to each axle being substantially parallel, and flexible power transmitting means interconnecting the forward and rear wheels on said tandem axles whereby the force applied to the wheels on one of said axles is transmitted to the wheels on the other of said axles.

2. A suspension system as set forth in claim 1 having hanger brackets secured to the vehicle frame to receive the ends of the springs opposite to the ends received in said equalizing means, each said hanger bracket having a cavity defined by end and side walls, a resilient block received in each said cavity, said blocks being of trapezoidal cross section, the parallel sides of said trapezoidal blocks disposed adjacent said end walls, the longer of said parallel sides being closed to said equalizer, a longitudinal upwardly curved spring seat bonded to each said block, said spring seats extending longitudinally outwardly from said block past said end walls, the distance between said spring seats and the end wall closer to said equalizer being generally greater than the distance between said spring seats and the other of said end walls, said seats slidingly engaged by said spring ends.

3. A suspension system as set forth in claim 1 having hanger brackets secured to the vehicle frame to receive the ends of the springs opposite to the ends received in said equalizing means, each said hanger bracket having a cavity defined by end and side walls, a resilient block received in each said cavity, said blocks being of trapezoidal cross section, the parallel sides of said trapezoidal blocks disposed adjacent said end walls, the longer of said parallel sides being closer to said equalizer, a longitudinal upwardly curved spring seat bonded to each said block, said spring seats extending longitudinally outwardly from said block past said end walls, the distance between said spring seats and the end wall closer to said equalizer being generally greater than the distance between said spring seats and the other of said end walls, said seats slidingly engaged by said spring ends and adapted to rock on said resilient blocks in response to deflection of said spring under light spring loading and to engage the wall outwardly of said equalizer and swing toward engagement of the other wall as the spring loading is progressively increased.

4. A suspension system for mounting dual axles to a vehicle frame when one of said axles is connected to a drive shaft and the other said axle is powered by a transmission drive means connection between said axles, comprising, tandem leaf springs on each side of said frame, means for equalizing the adjacent ends of said tandem springs, each of said tandem axles connected beneath the medial portions of the correspondingly tandem springs, a connecting ear rigidly secured to and extending beneath each said axle, one ear in proximity to each connection between said axles and said springs, a rigid connecting arm extending from said frame between each of said tandem springs and terminating in alignment with and slightly above the level of the connecting ears associated with each tandem spring arrangement, a lower torque rod pivotally connected between said connecting arms and each ear aligned therewith, an upper connecting ear rigidly secured to and extending above each said axle, one end of an upper torque rod being pivotally connected to each said upper connecting ear, the other end of each said upper torque rod being pivotally connected to said frame medially of said axles, said torque rods being oriented substantially parallel to the plane in which the axes of said axles lie in order to maintain a substantially constant dimension between said axles as they fluctuate vertically with the imposition of a load, said torque rods being adjustable in longitudinal dimension to permit selection and maintenance of the angle between the drive shaft and the axle to which it is connected, and flexible power transmitting means interconnecting the forward and rear wheels on said tandem axles whereby the force applied to the wheels on one of said axles is transmitted to the wheels on the other of said axles.

References Cited in the file of this patent
UNITED STATES PATENTS

| | | |
|---|---|---|
| 2,620,226 | Jones | Dec. 2, 1952 |
| 2,639,166 | Jones | May 19, 1953 |
| 2,733,612 | Sterkel | Feb. 7, 1956 |
| 2,741,491 | Van Raden | Apr. 10, 1956 |
| 2,825,415 | Boughner et al. | Mar. 4, 1958 |
| 2,841,414 | Ward | July 1, 1958 |
| 2,912,251 | Warren | Nov. 10, 1959 |
| 2,951,709 | Ward | Sept. 6, 1960 |
| 2,954,986 | Boyles | Oct. 4, 1960 |
| 3,034,592 | Butler | May 15, 1962 |
| 3,074,738 | Ward | Jan. 22, 1963 |

OTHER REFERENCES

Automobile Engineer, April 1952, page 146.